(12) United States Patent
Davis et al.

(10) Patent No.: US 8,468,386 B2
(45) Date of Patent: *Jun. 18, 2013

(54) DETECTING AND RECOVERING FROM PROCESS FAILURES

(75) Inventors: Tristan A. Davis, Redmond, WA (US); Andrew Kenneth Bishop, Bothell, WA (US); Clifford Jeffrey Cruzan, Snohomish, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/333,668

(22) Filed: Dec. 21, 2011

(65) Prior Publication Data

US 2012/0096303 A1     Apr. 19, 2012

Related U.S. Application Data

(63) Continuation of application No. 12/722,971, filed on Mar. 12, 2010, now Pat. No. 8,103,905.

(51) Int. Cl.
*G06F 11/00* (2006.01)
(52) U.S. Cl.
USPC ............................ 714/11; 714/38.1; 714/47.1
(58) Field of Classification Search
USPC .......................................... 714/11, 38.1, 47.1
See application file for complete search history.

(56) References Cited

U.S. PATENT DOCUMENTS

| | | | |
|---|---|---|---|
| 5,870,545 A | 2/1999 | Davis et al. | |
| 6,199,179 B1 | 3/2001 | Kauffman et al. | |
| 6,249,879 B1 | 6/2001 | Walker et al. | |
| 6,311,219 B1 | 10/2001 | Factor | |
| 6,341,302 B1 | 1/2002 | Celis | |
| 6,490,693 B1 | 12/2002 | Briskey et al. | |
| 6,578,159 B1 | 6/2003 | Kitagawa et al. | |
| 6,918,053 B1 | 7/2005 | Thatte et al. | |
| 6,990,547 B2 | 1/2006 | Ulrich et al. | |
| 7,669,074 B2 | 2/2010 | Chafle et al. | |
| 7,681,087 B2 | 3/2010 | Simpson et al. | |
| 7,743,281 B2 | 6/2010 | Conger et al. | |
| 7,747,899 B2 | 6/2010 | Tolskyakov et al. | |
| 7,823,021 B2 | 10/2010 | Abe | |
| 7,860,968 B2 | 12/2010 | Bornhoevd et al. | |

(Continued)

OTHER PUBLICATIONS

Apache Ode; "Apache Ode: Activity Failure and Recovery (page created)"; Feb. 2007; accessed at http://www.mail-archive.com/ode-commits@incubator.apache.org/msg00940.html; 3 pgs.

(Continued)

*Primary Examiner* — Marc Duncan
(74) *Attorney, Agent, or Firm* — Merchant & Gould PC

(57) ABSTRACT

A service is used to process files. The processing of the files is performed by worker services that are assigned to process a portion of the files. Each worker service that is processing a portion of the files is assigned a unique identifier. Using the identifier information, the set of worker services currently active are monitored along with the work assigned to each process. When a worker server determines that a worker service has failed, the work assigned to the failed worker service can be automatically determined and a new worker service can be started to process that work. Any new worker service that is started is assigned a unique identifier, so the work assigned to it can be similarly tracked.

20 Claims, 5 Drawing Sheets

U.S. PATENT DOCUMENTS

| | | | |
|---|---|---|---|
| 8,068,443 B2* | 11/2011 | Riley et al. | 370/258 |
| 8,103,905 B2* | 1/2012 | Davis et al. | 714/11 |
| 8,266,620 B2* | 9/2012 | Kissell | 718/100 |
| 2002/0112196 A1 | 8/2002 | Datta et al. | |
| 2003/0110416 A1 | 6/2003 | Morrison et al. | |
| 2004/0215997 A1 | 10/2004 | Anderson et al. | |
| 2004/0268317 A1 | 12/2004 | Gouriou et al. | |
| 2005/0235136 A1 | 10/2005 | Barsotti et al. | |
| 2006/0107108 A1 | 5/2006 | Geng et al. | |
| 2006/0259526 A1 | 11/2006 | Booz et al. | |
| 2007/0214381 A1 | 9/2007 | Goyal et al. | |
| 2007/0214457 A1 | 9/2007 | Goyal et al. | |
| 2008/0127205 A1 | 5/2008 | Barros | |

OTHER PUBLICATIONS

IBM; "Business Process with BPEL4WS: Learning BPEL4WS, Part 7"; Apr. 2003; accessed at http://www.ibm.com/developerworks/library/ws-bpelcol7/; 9 pgs.

PacktPub; "SOA process architecture, modeling and simulation in BPEL, TiBCO's BusinessWorks, and BEA's Weblogic Integration"; Dec. 2008; accessed at http://www.javabeat.net/articles; 24 pgs.

PacktPublishing; "Fast Short-Running BPEL"; accessed at http://www.packtpub.com/article/short-and-long-running-processes-soa-2 on Jan. 12, 2010; 8 PGS.

\* cited by examiner

DETECTING AND RECOVERING FROM PROCESS FAILURES

CROSS-REFERENCE TO RELATED APPLICATIONS

This application is a continuation of, and claims priority to, U.S. patent application Ser. No. 12/722,971, now U.S. Pat. No. 8,103,905, filed on Mar. 12, 2010, entitled "Detecting and Recovering from Process Failures."

BACKGROUND

When a service, such as a document conversion service, operates against large sets of files, the service may sometimes fault during processing. The fault may be caused by different reasons. For example, the fault may be a general error, the fault may be caused by an incorrectly formatted input file, and the like. These faults can cause files to not be processed and/or data being lost.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A service is used to process a group of files. The processing of the files is performed by a group of worker services that are each assigned to process a portion of the files. Each worker service that is processing a portion of the files is assigned a unique identifier. Using the identifier information, the set of worker services currently active are monitored along with the work assigned to each process. When a worker process manager determines that a worker service has failed, a new worker service can be started to process that work. Any new worker service that is started is assigned a different unique identifier. To help guard against malicious files causing repeated faults during processing, files are processed by worker processes, such that the files do not cause the worker service to fault. The worker service may also may also prevent files that cause multiple faults to not be continually retried.

DETAILED DESCRIPTION

Figure 1:
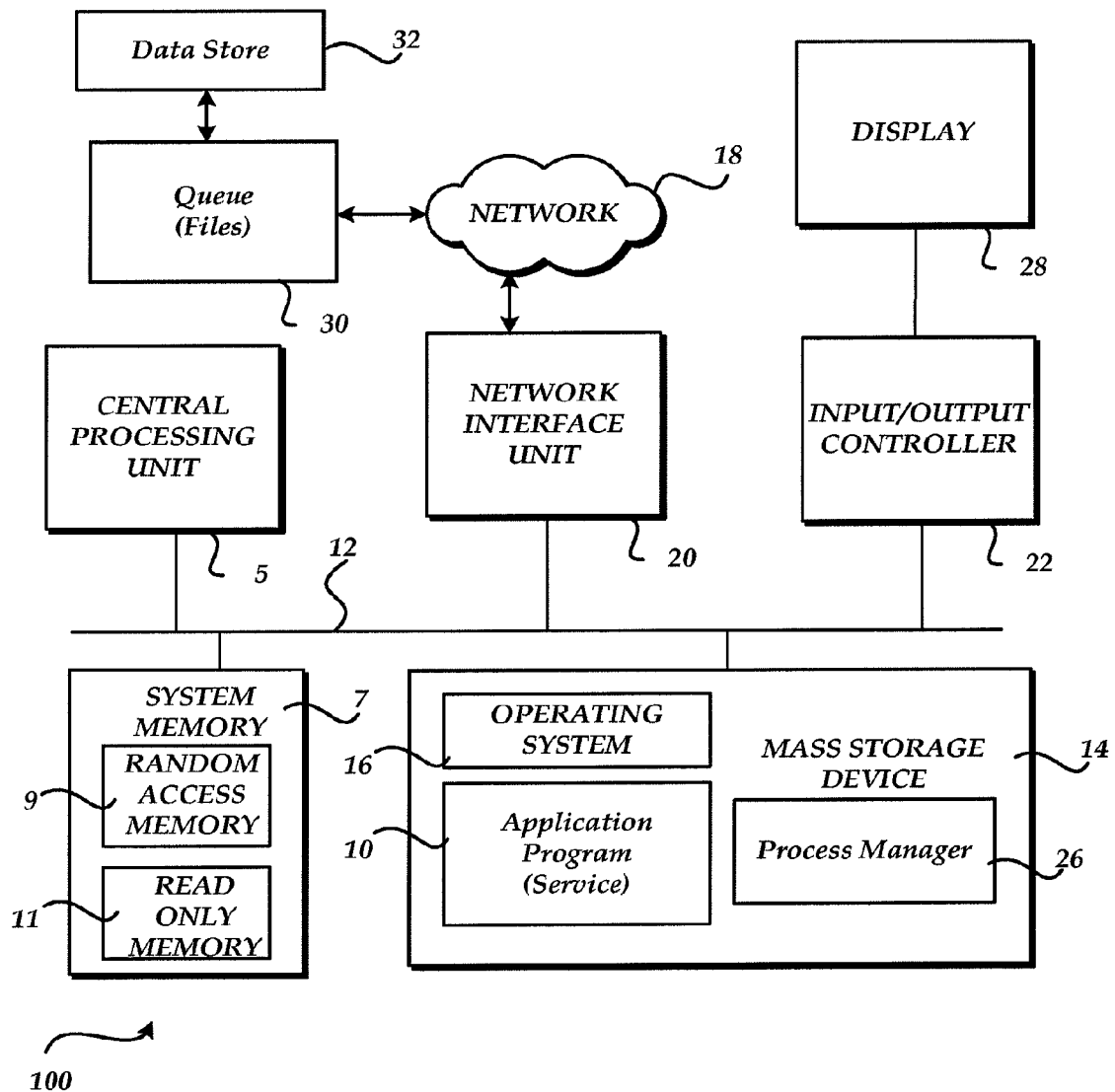
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. Computer 100 may be coupled to a queue server 30 that is coupled to a data store for storing items. According to one embodiment, data store 32 is configured to store a database. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer and/or a server computer, such as the WINDOWS 7® or WINDOWS SERVER® operating systems from MICROSOFT CORPORATION of Redmond, Wash. The mass storage device 14 and RAM 9 may also store one or more program modules. In particular, the mass storage device 14 and the RAM 9 may store an application program 10, such as a service for processing files. For example, the service may be a file conversion service, a pagination service, a batch editing service, a photo editing service, and the like.

Although process manager 26 is shown separate from application program 10, it may be included within application program 10. As will be described in greater detail below, the process manager 26 is configured to manage the processing of a group of files. Process manager 26 assigns the processing of the files to one or more worker services that are each assigned a portion of the files to process. Each worker service that is processing a portion of the files is assigned a unique identifier. Using the identifier information, the set of worker services currently active are monitored by process manager 26 along with the work assigned to each worker service. When process manager 26 determines that a worker service has failed by examining the current identifiers, the work assigned to the failed worker service can be automatically determined and a new worker service can be started to process that work. Any new worker service that is started is assigned a different unique identifier.

Figure 2:
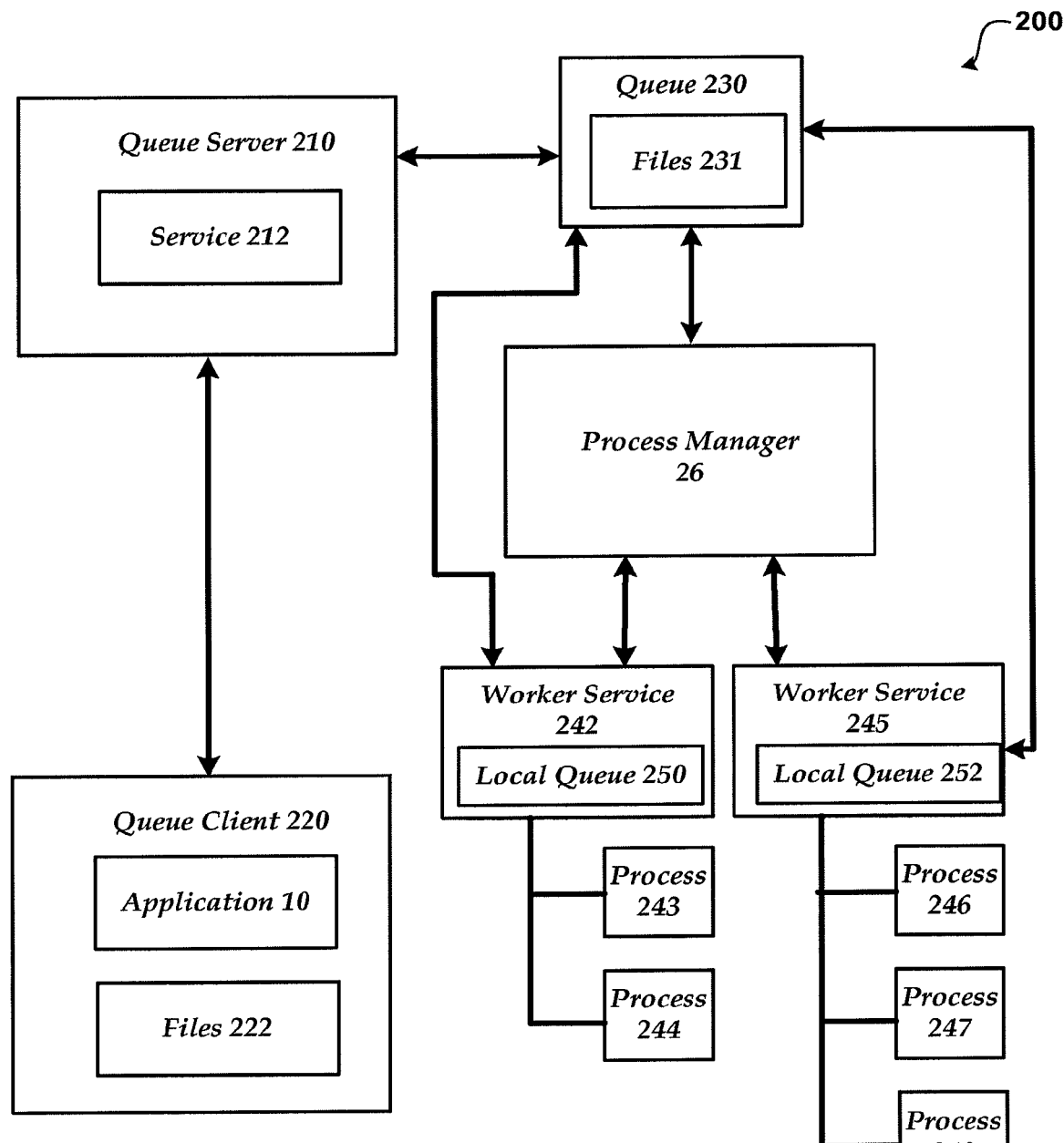
FIG. 2 shows a system for processing a group of files.

FIG. 2 shows a system 200 for processing a group of files. As illustrated, system 200 includes queue server 210, queue client 220, queue 230, process manager 26, worker service 242, worker service 245 and worker processes 243, 244, 246, 247 and 248.

As briefly described above, the process manager 26 is directed at managing the processing of the files performed by the worker services, such as worker service 242 and 245. There may be any number of worker services. The service 212 may be any type of service that operates on files, such as files 231 stored in queue 230. For example, the service 212 may be a batch file processor, a conversion service, a formatting service, an archiving service, and the like. Generally, the service operates on a large set of files. Files 231 may be any number of files. For example, there could be 2, 100, 1000, 10,000, or even hundreds of thousands of files that are to be processed by service 212. Service 212 places jobs and the files to process in queue 230. As illustrated, process manager 26 manages the processing on at least a portion of the files 231 using one or more worker services (242, 243) that each utilize one or more worker processes (243, 244, 246, 247, 248). The worker services may be located on one or more computing devices. For example, worker service 242 may be located on one computing device and worker service 245 may be located on a different computing device.

Queue client 220 is configured to request an action to be performed on a group of files, such as files 222. According to one embodiment, an initial message is first sent by client 220 to server 210 that identifies the job and job settings. Following the first message, is one or more messages that include the listing of the files to be processed. Finally, an end message is sent by client 220 to server 210 indicating that all of the files have been identified. Once files along with the action to perform on the files have been identified and stored in queue 230, process manager 26 assigns a portion of the files to the available worker services, such as worker service 242 and worker service 245. Process manager 26 stores the list of files that it has assigned to each of the worker services. For example, the list of assignments may be stored as part of queue 230 or some other data store. Process manager 26 assigns each worker service a unique identifier that identifies that instance of the worker service. Whenever a new worker service is started/restarted, the worker service is assigned a different unique identifier.

Process manager 26 monitors each worker service during the processing of the assigned files. The monitoring may occur automatically at predetermined times/intervals and/or on demand. Using the unique identifier information, process manager 26 track the set of worker services that are currently active along with a status of the work that is assigned to each one. When a worker service identifier changes, process manager 26 immediately knows what work was not processed by examining the stored list of assigned files and can restart that work on a new instance of a worker server and/or redistribute the work to other worker services. When a file has completed processing, the worker service handling the processing the file updates the status of the processing for the file. According to one embodiment, the worker service updates the status to completed or not completed within queue 230. According to one embodiment, when the file is not successfully processed, an attempt count for the file is updated within queue 230. When the attempt count has reached a predetermined limit, the file is no longer attempted to be processed.

To help guard against malicious files causing repeated faults when being processed, a worker service may create one or more separate worker processes (such as worker processes 243 and 244 for worker service 242 and worker processes 246, 247 and 248 for worker service 245). In this way, when a file causes the worker process to fault, the worker service process that created the worker process is still operational and can adjust the retry count. Each worker service process may store information showing what files are assigned to each of the worker processes. For example, queue 250 may store the information relating to worker service 242 and queue 252 may store the information for worker service 245.

Figure 3:
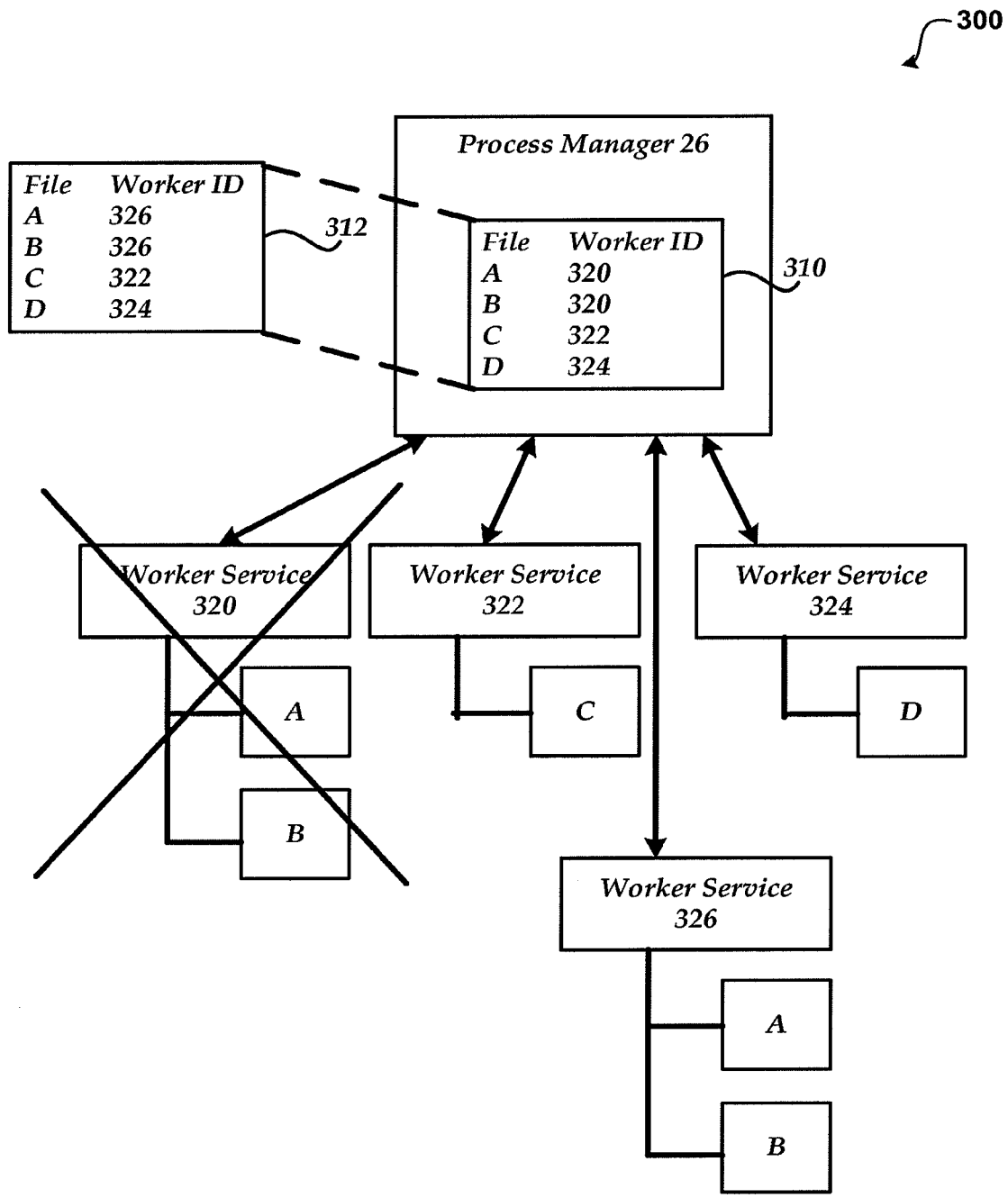
FIG. 3 shows a system when a worker service fails and a new worker service is started.

FIG. 3 shows a system when a worker service fails and a new worker service is started. As illustrated system 300 includes process manager 26, worker service 320, worker service 322, worker service 324 and worker service 326.

Initially, process manager 26 has assigned files A and B to be processed by worker service 320, file C to be processed by worker service 322 and file D to be processed by worker service 324. According to one embodiment, process manager 26 stores the assignment information within a data store, such as within table 310 that shows the file and the identifier of the worker service assigned to process the file. When a fault occurs, such as worker service 320, an identifier is missing when process manager 26 monitors the worker services. Upon determining that a worker service has faulted, process manager 26 determines the files being handled by the worker service that faulted by accessing the stored information in table 310 and starts a new worker service and assigns the files that were not serviced to a new worker service. In the current example, worker service 326 is started. Alternatively, worker service 322 and 324 may be assigned the task of processing the files that were assigned to the worker service that faulted. Table 312 shows the updated status of the file assignments after worker service 326 has started. As can be seen, files A and B have been reassigned to worker service 326.

Figure 4:
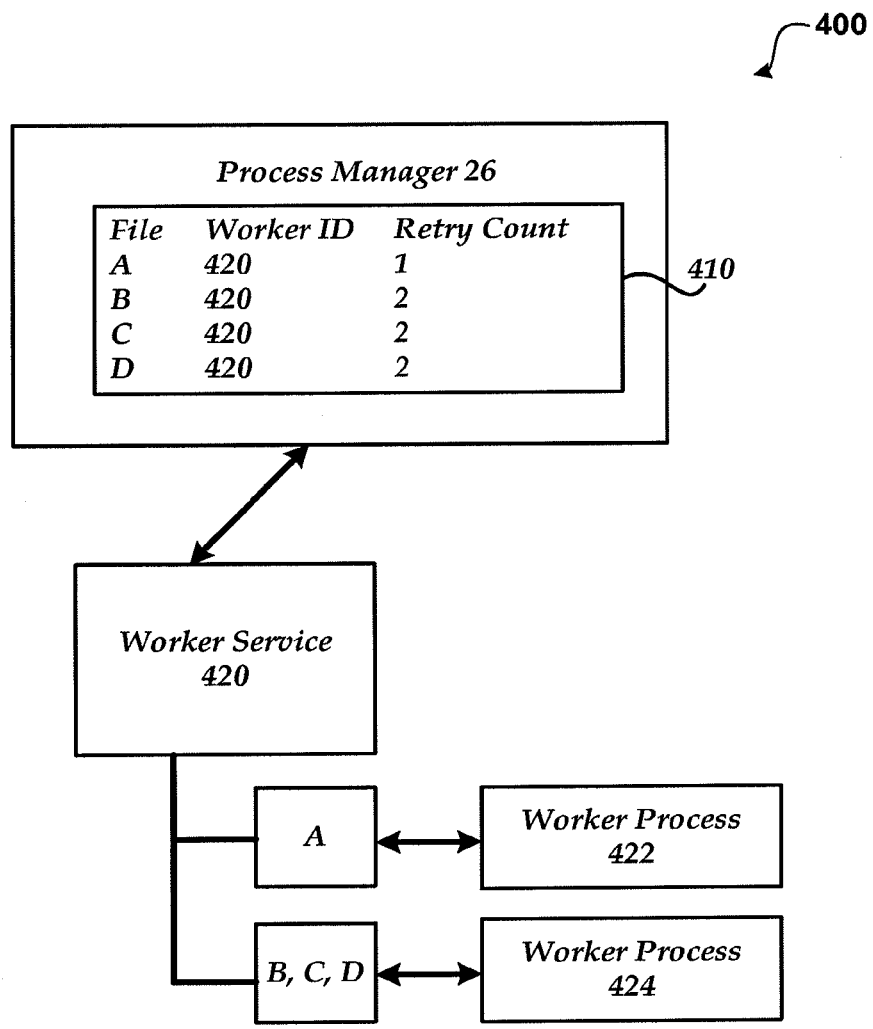
FIG. 4 illustrates worker processes assigned by a worker service to process files.

FIG. 4 illustrates worker processes assigned by a worker service to process files. As illustrated, system 400 includes process manager 26, worker service 420, and worker processes 422 and 424.

In the example of system 400, process manager 26 has assigned files A, B, C and D to be processed by worker service 420. As discussed above, each worker service may create one or more worker processes to process the files. File A has been assigned to worker process 422 and files B, C, and D have been assigned to worker process 424. The failure of one of the worker processes does not result in the master worker service to fail. Table 410 shows the file assignments and a retry count field. According to one embodiment, the retry count field is set to a predetermined number of attempts. For example, two, three, five, ten, and the like. In the current example, the retry count is set to two attempts to process the file.

When a file is processed by a worker process, the master process (worker service 420) monitors for the result of that processing action. If the action fails, or causes the worker process to fault, the file in question is retried, but after a defined number of retries, the file is no longer retried. When the processing of a file is successful, the worker service process updates the status of the file in the queue to success and clears its information from table 410. If a failure, the worker service process decrements the retry count by one in the queue, and lets the process manager determine how to process the file. For example, the process manager may redistribute the file to another worker service process or start a new instance of a worker service process.

Figure 5:
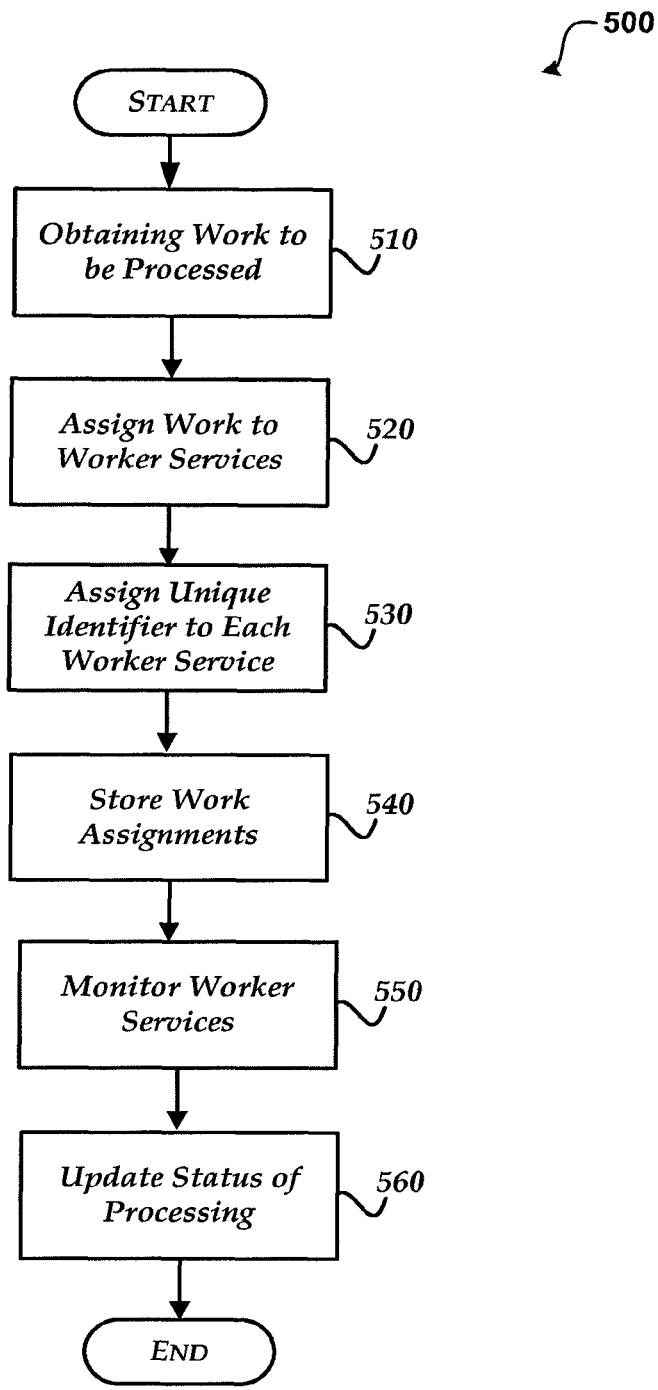
FIG. 5 shows a process for detecting and recovering from application failures.

Referring now to FIG. 5, an illustrative process for detecting and recovering from application failures will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 510, where work is obtained to be processed. As discussed above, the work relates to performing actions on a group of files and many be many different types of actions relating to file processing. For example, the action may be file conversion, batch editing, photo editing, archiving, and the like. Generally, the work involves a large set of files.

Moving to operation 520, the work is split between one or more worker services. The work may be split many different ways. For example, the files may be evenly distributed, the files may be split based on a parameter of the files (i.e. size, type, and the like), the files may be split based on processing capability of the worker services and the like. According to one embodiment, a process manager determines how the files are split between the different worker services.

Flowing to operation 530, a unique identifier is assigned to each worker service. According to one embodiment, each instance of a worker service receives a new identifier. In this way, even when a worker service is restarted, the restarted worker service is assigned a different identifier then when it previously executed.

Transitioning to operation 540, the work assignments for each of the files in the obtained work is stored. The work assignments may be stored in a temporary memory and/or a permanent memory. According to one embodiment, the work assignments are stored in a queue and include the worker service assigned to process the file and a number of attempts to process the file. As discussed above, the number of attempts is used to determine when a file is causing a process to repeatedly fail.

Flowing to operation 550, the worker services are monitored at predetermined times/intervals. The monitoring may also be performed on demand. The monitoring is used to track the set of worker services that are currently active along with a status of the work that is assigned to each one. When a worker service identifier changes, it can be determined from the stored work assignments what work was not processed and a new worker server may be started and/or the work may be redistributed.

Moving to operation 560, the status of processing the files is updated. When a file has completed processing the worker service handling the processing the file updates the status of the processing for the file. According to one embodiment, the worker service updates the status to completed or not complete. According to one embodiment, when the file is not successfully processed, an attempt count for the file is updated. When the attempt count has reached a predetermined limit, the file is no longer attempted to be processed.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a plurality of files, the method comprising:
   dividing at least a portion of the plurality of files among a plurality of services;
   assigning each of the plurality of services a unique identifier, wherein the unique identifier for a first one of the plurality of services is updated for each instantiation of the first one of the plurality of services;
   monitoring each of the plurality of services as each of the plurality of services processes its portion of the plurality of files; and
   updating a queue with status information corresponding to the processing of the at least the portion of the plurality of files.

2. The method of claim 1, wherein the unique identifier for the first one of the plurality of services is updated when the first one of the plurality of services is restarted.

3. The method of claim 1, further comprising updating the queue with status information when a new file from the plurality of files is assigned to the first one of the plurality of services.

4. The method of claim 1, wherein updating a queue with status information includes updating a count associated with at least one file of the at least the portion of the plurality of files when the at least one file is unsuccessfully processed.

5. The method of claim 4, further comprising discontinuing processing of the at least one file when the count reaches a predetermined value.

6. The method of claim 4, further comprising assigning a remaining portion of the at least the portion of the plurality of files to a different one of the plurality of services when the at least one file is unsuccessfully processed, wherein the remaining portion of the at least the portion of the plurality of files does not include the at least one file that was unsuccessfully processed.

7. The method of claim 6, wherein the different one of the plurality of services is an instance of the first one of the plurality of services.

8. A computer-readable storage device encoding computer executable instructions that, when executed by at least one processor, performs a method for processing a plurality of files, the method comprising:
- dividing at least a portion of the plurality of files among a plurality of services;
- assigning each of the plurality of services a unique identifier, wherein the unique identifier for a first one of the plurality of services is updated for each instantiation of the first one of the plurality of services;
- monitoring each of the plurality of services as each of the plurality of services processes its portion of the plurality of files; and
- updating a queue with status information corresponding to the processing of the at least the portion of the plurality of files.

9. The computer-readable storage device of claim 8, further comprising instruction for updating the unique identifier for the first one of the plurality of services when the first one of the plurality of services is restarted.

10. The computer-readable storage device of claim 8, further comprising instructions for updating the queue with status information when a new file from the plurality of files is assigned to the first one of the plurality of services.

11. The computer-readable storage device of claim 8, wherein updating a queue with status information includes updating a count associated with at least one file of the at least the portion of the plurality of files when the at least one file is unsuccessfully processed.

12. The computer-readable storage device of claim 11, further comprising instructions for discontinuing processing of the at least one file when the count reaches a predetermined value.

13. The computer-readable storage device of claim 11, further comprising instructions for assigning a remaining portion of the at least the portion of the plurality of files to a different one of the plurality of services when the at least one file is unsuccessfully processed, wherein the remaining portion of the at least the portion of the plurality of files does not include the at least one file that was unsuccessfully processed.

14. The computer-readable storage device of claim 13, wherein the different one of the plurality of services is an instance of the first one of the plurality of services.

15. A system comprising:
one or more processors; and
a memory coupled to the one or more processors, the memory for storing instructions that, when executed by the one or more processors, cause the one or more processors to perform a method for processing a plurality of files, the method comprising:
- dividing at least a portion of the plurality of files among a plurality of services;
- assigning each of the plurality of services a unique identifier, wherein the unique identifier for a first one of the plurality of services is updated for each instantiation of the first one of the plurality of services;
- monitoring each of the plurality of services as each of the plurality of services processes its portion of the plurality of files; and
- updating a queue with status information corresponding to the processing of the at least the portion of the plurality of files.

16. The system of claim 15, wherein the memory for storing instructions further includes instructions for updating the unique identifier for the first one of the plurality of services when the first one of the plurality of services is restarted.

17. The system of claim 15, wherein the memory for storing instructions further includes instructions for updating the queue with status information when a new file from the plurality of files is assigned to the first one of the plurality of services.

18. The system of claim 15, wherein updating a queue with status information includes updating a count associated with at least one file of the at least the portion of the plurality of files when the at least one file is unsuccessfully processed.

19. The system of claim 18, wherein the memory for storing instructions further includes instructions for discontinuing processing of the at least one file when the count reaches a predetermined value.

20. The system of claim 18, wherein the memory for storing instructions further includes instructions for assigning a remaining portion of the at least the portion of the plurality of files to a different one of the plurality of services when the at least one file is unsuccessfully processed, wherein the remaining portion of the at least the portion of the plurality of files does not include the at least one file that was unsuccessfully processed.

* * * * *